United States Patent
Mak et al.

(10) Patent No.: US 9,226,114 B2
(45) Date of Patent: Dec. 29, 2015

(54) METHOD AND SYSTEM OF INCORPORATING PASSIVE-BASED PROXIMITY DATA FOR POSITION DETERMINATION

(71) Applicant: Hong Kong Applied Science and Technology Research Institute Co., Ltd., Shatin, New Territories (HK)

(72) Inventors: Chi-Lun Mak, Ma On Shan (HK); Manming Andrew Hon, Shatin (HK); Vincent Wan-Ming Lau, Shatin (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 19 days.

(21) Appl. No.: 14/213,312

(22) Filed: Mar. 14, 2014

(65) Prior Publication Data

US 2015/0264535 A1   Sep. 17, 2015

(51) Int. Cl.
*H04W 4/04* (2009.01)
*H04W 24/08* (2009.01)

(52) U.S. Cl.
CPC .............. *H04W 4/043* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2007/0042780 A1* | 2/2007 | Attar | ...................... | H04W 36/18 455/445 |
| 2012/0147937 A1* | 6/2012 | Goss | ................... | G06F 12/1408 375/222 |
| 2015/0074407 A1* | 3/2015 | Palmeri | ................. | H04L 63/166 713/171 |

* cited by examiner

*Primary Examiner* — Diane Mizrahi
(74) *Attorney, Agent, or Firm* — Norton Rose Fulbright US LLP

(57) ABSTRACT

Systems and methods establish passive-based proximity regions to determine position of a device and an area. Example embodiments may be utilized in a wireless network where passive-based proximity regions are established for one or more access points in a wireless network. When a wireless device enters or moves through such a passive-based proximity region, one or more resources associated with the wireless network or wireless device may recognize the presence of the passive-based region and utilize this information to determine positioning data for the wireless device.

11 Claims, 8 Drawing Sheets

METHOD AND SYSTEM OF INCORPORATING PASSIVE-BASED PROXIMITY DATA FOR POSITION DETERMINATION

TECHNICAL FIELD

The present application relates to determining the position of a wireless device, and more particularly to utilizing passive-based proximity information for the determination.

BACKGROUND

Many applications in wireless communications utilize the location of a particular wireless device. Such location information may be used within an application itself, e.g. for navigating a user between locations. Additionally, location information may be utilized by the wireless network and/or the user device to better direct communications, to understand hardware/bandwidth allocations and the like.

In indoor networks, such as a local Wi-Fi network, the utilization of global positioning system (GPS) signals for location acquisition is not feasible. This is primarily because GPS signals are too attenuated to be received by devices in and indoor environment and therefore cannot be relied on to provide location information within a structure.

Because GPS is not an adequate indoor solution for location determinations of devices in a wireless network, other indoor localization methods have been implemented. Some of these methods utilize various radio frequency (RF) techniques such as triangulation, scene analysis and proximity-based methods.

In a triangulation method, a device transmits/receives a signal to/from three or more different known locations, and the location/position of the device is determined based on the angle of arrival, time of arrival, and signal strength directly to/from these known locations. These methods, however, suffer from multiple deficiencies. For example, in an indoor environment, walls, furniture, people and other moving obstacles are affecting radio waves randomly and therefore signals may arrive in unpredictable indirect path which affecting the angle/time of arrival, and appear weaker for reasons other than distance from a particular location. Therefore, multipath effects tend to interfere with triangulation techniques and degrading the accuracy of position determination.

Scene analysis methods utilize a rough estimation of the position of a device based on the ubiquitous radio frequency signals such as Wi-Fi signal, which becomes commonly found everywhere in the city. Prior to determining a position of a device, a network administrator must collect a database record of signal strengths from multiple transmission points at each position, known as radio map, within the network range. This is sometimes referred to as "fingerprinting" the network. When a wireless device is deployed in the network, the signal strengths observed from various points in the network can then be compared or referenced to the database record to see which location experienced similar signal strengths, thereby providing a position determination. The main drawback of scene analysis methods however, is that there is a relatively low degree of accuracy. For example, a position determination made using a scene analysis method may only be accurate up to around 5 to 10 meters depending on the no. of access points and how they were deployed. One benefit is that the wireless device is unlikely to be lost track.

Proximity-based methods utilize additional hardware resources, such as RFID beacons deployed throughout the wireless network and RFID tags on the various wireless devices. When a wireless device is near a beacon, which usually radiate in all directions, communication between the beacon and tag may provide information for acquiring positioning data. These methods provide similar or slightly better location resolution than scene analysis methods especially at some targeted locations with beacons. However, this still is a relatively low degree of accuracy because fuzzy location identification may occur as the tag may receive signal from more than one beacons, or the wireless device maybe lost track if no signals is received from any beacons. Further, proximity-based methods are disadvantageous because of the requirement to utilize additional hardware in order to accomplish positioning location tasks. This hardware adds additional expense and complications within the wireless network.

Some methods have attempted to combine scene analysis and proximity-based methods which utilize fingerprinting and beacon-based signals. These methods have produced a better degree of service (e.g. detection of position may up to around 3-5 meters of resolution at some specific locations and maintain better tracking of the device). However, such methods still require additional hardware resources and undergo fuzzy location identification as described above.

BRIEF SUMMARY

Systems and methods establish passive-based proximity regions to determine position of a device and an area. Example embodiments may be utilized in various settings such as a wireless network where passive-based proximity regions are established for one or more access points in a wireless network. In this example, when a wireless device enters or moves through a passive-based proximity region, one or more resources associated with the wireless network or wireless device may recognize the presence of the region and utilize this information to determine positioning data for the wireless device.

In one embodiment, a passive-based proximity region may be established by causing an antenna radiation pattern of an access point to include a weak signal region or null region. The shape, size and location of this null region may be established in a manner with respect to other network resources such that when a wireless device enters this region the position of the wireless device can be accurately determined as weak or null region is inherently occurs in a narrow direction. For example, in one embodiment, the position of a wireless device may be determined within 1-3 meters.

In another embodiment a wireless network is provided which includes multiple access points. One or more of the access points are configured to create a passive-based proximity region proximate to the respective access points. A scene analysis fingerprinting database may be established for the access points which also includes information corresponding to "weak" entries for the passive-based proximity regions. With this network, a coarse location of a wireless device may be determined using the fingerprinting data and more precise location determinations may be determined when the "weak" entries are observed. With this approach, to further enhance position accuracy, compared to the approach of combining scene analysis and proximity-based method, no additional hardware is required, and no fuzzy location identification occurs.

In accordance with further embodiments, received signal strength time history of a wireless device is be tracked with respect to one or more access points or through a wireless network. Such information may be tracked dynamically as a wireless device enters and exits a passive-based proximity region or multiple passive-based proximity regions in a network. With this information, the movement of the wireless device may be tracked.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

The following description provides example embodiments primarily in the context of wireless network devices which transmit/receive Wi-Fi signals between one or more user devices. It is appreciated that the inventive concepts are not limited to such devices and transmission types. For example, many radiating devices may be configured to transmit with a weak or null regions (transmitting antennae, light sources having a dimmer/blocker to alter radiation, and the like). A receiving device may be configured to recognize such weak regions as described below utilizing corresponding reception capabilities, e.g. antennae, light sensors, and the like. It is further noted that while the primary examples are discussed with respect to an indoor network, the inventive concepts may be utilized with indoor and outdoor environments.

Figure 1A:
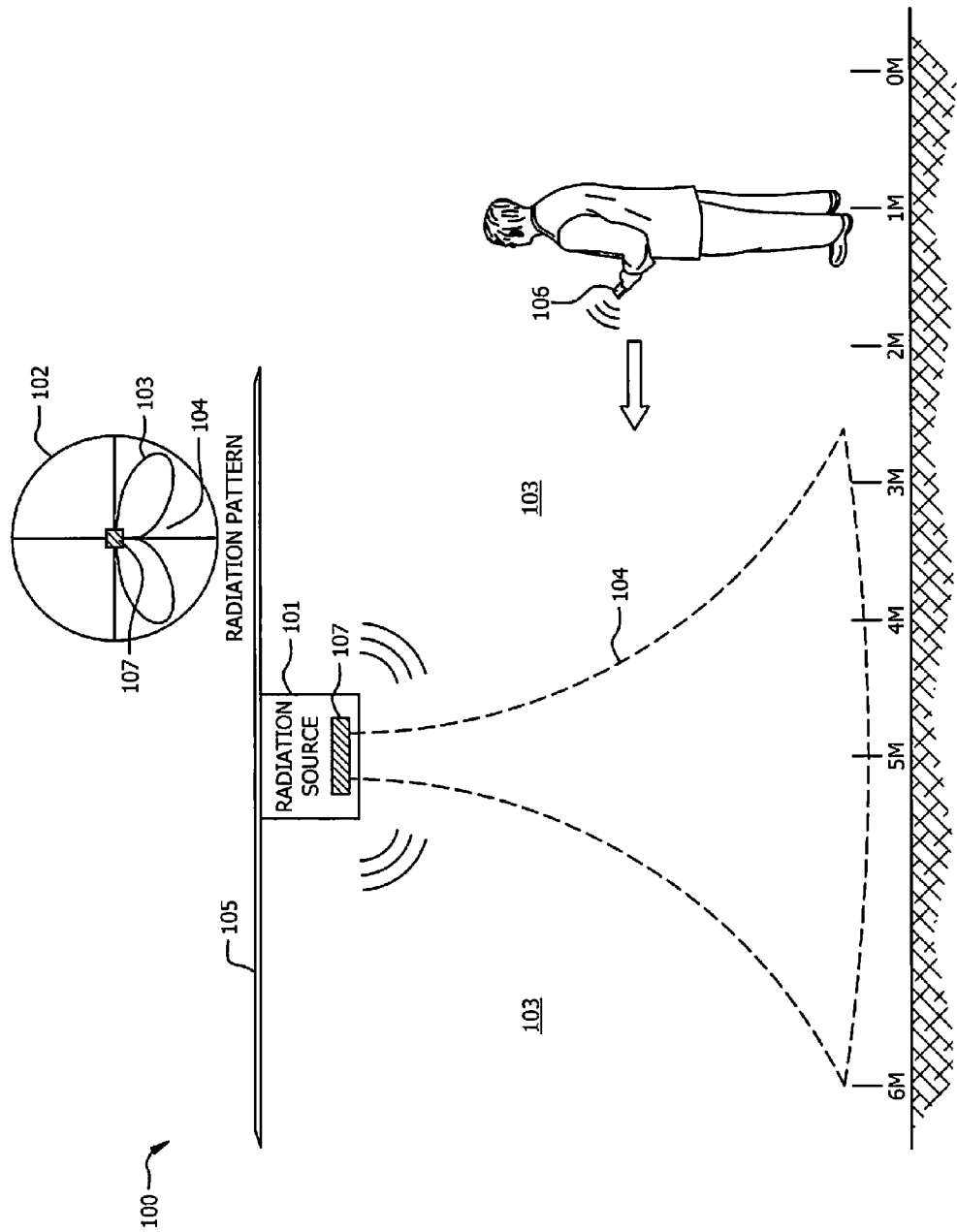
FIG. 1A illustrates a system having a passive-based proximity region in accordance with an embodiment of the present application.

FIG. 1 illustrates a system 100 having a passive-based proximity region in accordance with an embodiment of the present application. System 100 includes radiation source 101. Radiation source 101 may be implemented as any device which transmits any measurable physical magnitude, such as electromagnetic energy in one or more antennae (e.g. within a wireless router or station), a light source, etc. Measurable physical magnitude may also include other forms of energy such as sound waves, pressure waves, temperature/heat energy, humidity, etc.

In the illustrated embodiment radiation source 101 includes a radiation controlling component 107 (e.g. an antenna) having radiation pattern 102. Radiation pattern 102 includes active regions 103 and passive regions 104. It is appreciated that the shape, number and size of active 103 and passive regions 104 may be configurable based on the antenna/radiation pattern controlling component. It is further appreciated that passive region 104 may comprise a "null" region or may simply a region with appreciably weaker signal strength with respect to active region 103. In many instances, the terms passive, weak and null may be used interchangeably depending on the particular radiating device, usage preferences, etc. Different methods may be utilized based on the desired use of radiation source 101. For example, it may still be desired that some minimum amount of signal from radiation source 101 be observed at wireless device 106 in passive region 104. It is further appreciated that wireless device 106 does not necessarily need to be equipped with additional location-based hardware or functionality. For example, existing wireless network antenna in a common smart device may be utilized to measure (or receive) the signal strength from radiation source 101.

Additionally, radiation pattern 102 may correspond to a signal from a single antenna on its own, an antenna system in the form of an array, from multiple antennae, from multiple arrays of antennae, etc. As would be appreciated by a person of ordinary skill in the art, each circumstance may provide various advantages or disadvantages.

When radiation source 101 (including radiation controlling component 107) is deployed on ceiling 105 at least one passive region 104 is disposed directly under radiation source 101 (or may be pointed to a targeted location). In this manner, when wireless device 106 is moved or located within passive region 104, a weak signal (or an absence of a signal) compared to active region 103 from radiation source 101 is observed.

Figure 1B:
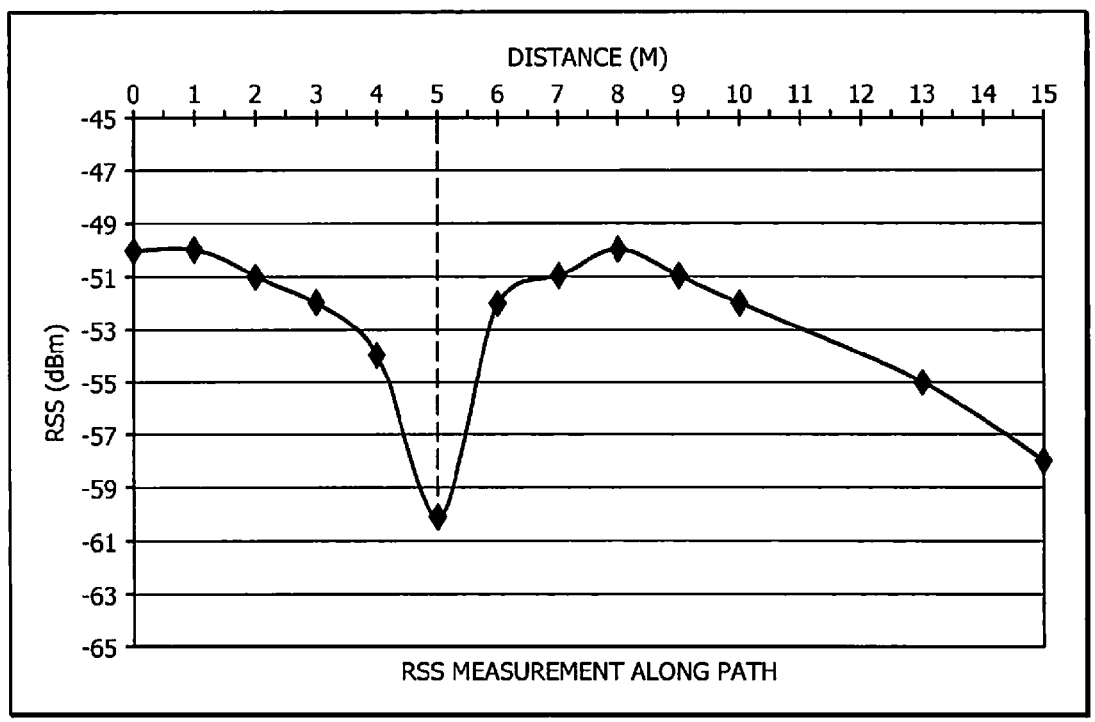
FIG. 1B illustrates an received signal strength plot for a device moving with respect to the system of FIG. 1A.

FIG. 1B illustrates a received signal strength (RSS) measurement along the path of motion of wireless device 106 moving right to left across passive region 104 of FIG. 1. It is noted that RSS measurements are utilized throughout the present application as any measurement that can determine the strength of a signal from a signal source. Embodiments are not limited to the type of measurement techniques/algorithms used to obtain these measurements.

As can be seen, at 0-2 meters wireless device 106 is within an active region 103 of radiation source 101. As wireless device 106 approaches passive region 104, the RSS measurement begins to sharply drop. As wireless device 106 continues to move, the observed RSS measurement recovers when device 106 reenters an active region 103. Additionally, as wireless device 106 continues to move, the RSS measurement gradually trails back to a minimum or eventually to minus infinity when device 106 is out of range of radiation source 101. In accordance with embodiments of the present application, this significant drop in RSS within a passive region may be utilized to determine positioning information for a wireless device with a higher degree of precision.

Figure 2A:
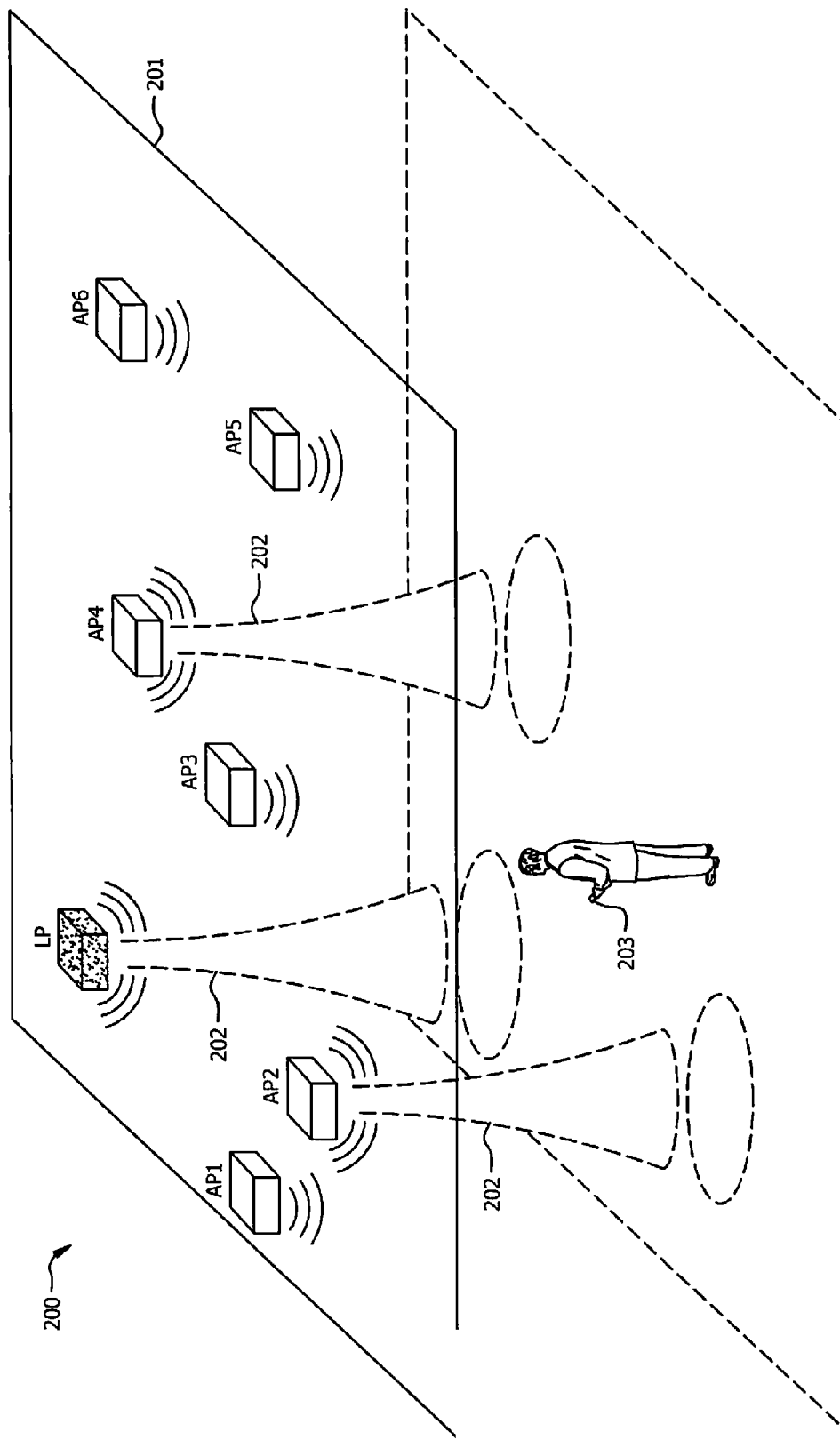
FIG. 2A illustrates a wireless network in accordance with an embodiment of the present application.

FIG. 2A illustrates a wireless network 200 in accordance with an embodiment of the present application. Wireless network 200 may be implemented as any type of network. For the sake of the present discussion it is assumed that network 200 is a Wi-Fi network having multiple access points AP1-AP6 distributed across area 201. One or more access points may be configured to produce passive zones 202 as well as the active zone to cover a wide area for ubiquitous Wi-Fi coverage, such as described above with respect to radiation source 101 of FIG. 1A. Such a passive zone may be produced by including at least one antenna within an access point/router which produces a desired radiation pattern. For example, a dipole, monopole, patch antenna may be utilized which includes a null region at passive zone 202.

It is appreciated that passive zone 202 may be configured such that the RSS measurement received at a device is weak, but not weak such that connection is lost. Further, the null region utilized may be configured to be differing widths with the understanding that a narrow region may provide for finer proximity resolution. For example, in one embodiment a region of 1-3 meters is utilized. Such a region provides a substantial improvement in proximity resolution. It is appreciated that narrower regions may be utilized to obtain even finer accuracy (e.g. <1 meter). It is noted that a null point of a radiation pattern is usually narrow. Further, techniques described herein may be utilized for more coarse location if desired. A network technician will recognize that a tradeoff of advantages will exist in these various scenarios. For example, the regions may be created such that they are wide enough that users come in proximity of the regions, but small enough that sufficient proximity resolution may be obtained for the particular application of the network.

It is further appreciated that while the illustrated embodiments show a downward-facing null region, such regions may be directionally oriented to cover a desired zone. For example, if a Wi-Fi router is disposed in a ceiling location in the middle of a room, but it is desirable to know when a wireless device is in a particular corner of the room, a passive region may be directed toward the desired location.

In some embodiments, network 200 may further include a separate location point LP. This location point may be implemented in hardware other than hardware normally utilized for a Wi-Fi router and may be provided for the purpose of providing additional location determination resolution. On the other hand, this LP can also be part of the Wi-Fi network for better signal coverage for connection. Further, LP's may be utilized to be directed toward particular points of interest. For example, a network may want to track wireless devices crossing a particular location (e.g. an exit of an escalator, retail location, restroom, and the like) for traffic monitoring.

Figure 2B:
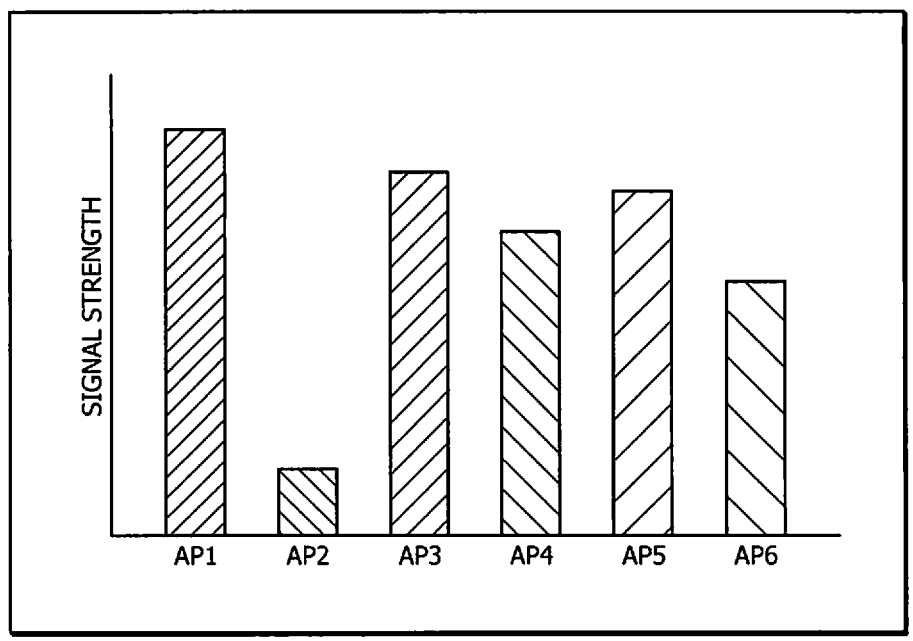
FIG. 2B illustrates a plot showing signal strength measurements from the wireless device of FIG. 2A.

FIG. 2B illustrates a plot showing received signal strength measurements from wireless device 203 standing within network 200 in accordance with an embodiment of the present application. As can be seen, wireless device 203 receives high signal strength readings from APs that are nearest to device 203 and lower readings for further APs. These readings are similar to scene analysis readings described above. However, as can be seen, device 203 receives a low or weak reading from AP2. Because of this, sufficient information exists to pinpoint the location of wireless device 203 within the null region of AP2. Therefore, by observing a low or weak reading from a particular AP, and at the same time, receiving strong signal from surrounding APs, embodiments may determine a position within the passive region of that particular AP with high degree of confidence. Based on this philosophy of observing multiple received signals from different AP, it is unlikely to have false fine-position determination.

Figures 3A, 3B, 3C:
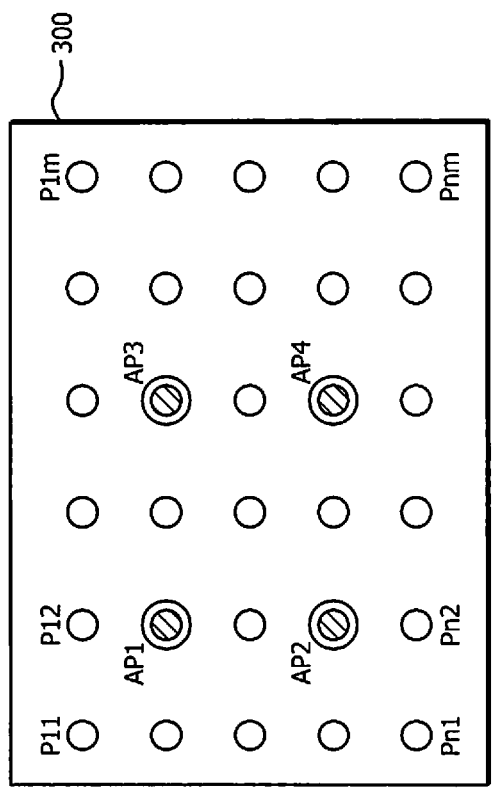
FIG. 3A illustrates an initial location mapping of a network in accordance with an embodiment of the present application.
FIG. 3B illustrates an initial location mapping of a network in accordance with an embodiment of the present application.
FIG. 3C illustrates an initial location mapping of a network in accordance with an embodiment of the present application.

In order to incorporate the mentioned passive-based proximity region, and implement the scene analysis discussed above with respect to FIG. 2, and initial mapping may be implemented. FIGS. 3A-3C illustrate an initial location mapping of a network in accordance with an embodiment of the present application. FIG. 3A illustrates a (top view of) network area 300 for a wireless network. Network area 300 includes multiple coordinate points from P11 to Pnm. Network area 300 further includes multiple access points, specifically, AP1, AP2, AP3, AP4, located at P22, P42, P24, P44, respectively. AP1-AP4 are configured to provide passive-based regions as described above. It is appreciated that the wireless network and network area 300 may be scaled to include many more coordinate points and APs and the present FIG. 3 has been simplified for the sake of explanation.

FIG. 3B illustrates a transmitter location map which provides information for coordinate and identity information for AP transmitters. FIG. 3C illustrates a fingerprinting database corresponding to network area 300. At each coordinate point in the network RSS measurements may be taken for the network and stored in the database. For example, at P11 there will be RSS measurements from AP1-AP4 which will have varying magnitudes. At other points in network area 300, such as P22 (the location of AP1), a weak or null measurement for AP1 may be observed where varying RSS measurements for the other APs are also observed (see also FIG. 2B). Such a measurement will signify that the location of a device in the network is at P22.

It is noted that at coordinate point P23, a wireless device may be outside the null region for AP1 but may not yet be receiving a strong RSS measurement for AP1 as the device exits the null region. Likewise, similar effects may be observed for AP3 at P23 due to the similar proximity of P23 to AP3. Accordingly, the effects of the null regions for the APs may further provide detail to provide better location resolution at points outside of the null regions due to the alteration of signal patterns that they cause within the fingerprint database of network area 300. As such, the present fingerprint provides for significant advantages over previous scene analysis techniques because additional location/resolution data is available.

In some embodiments, the fingerprint database of FIG. 3C is generated at the deployment of the wireless network. Further, in other embodiments, the fingerprint database may be dynamically created using feedback from various wireless devices. The database may also be updated (either offline or dynamically) as new devices come online within the network, or in response to a failure of one or more APs.

Figure 4:
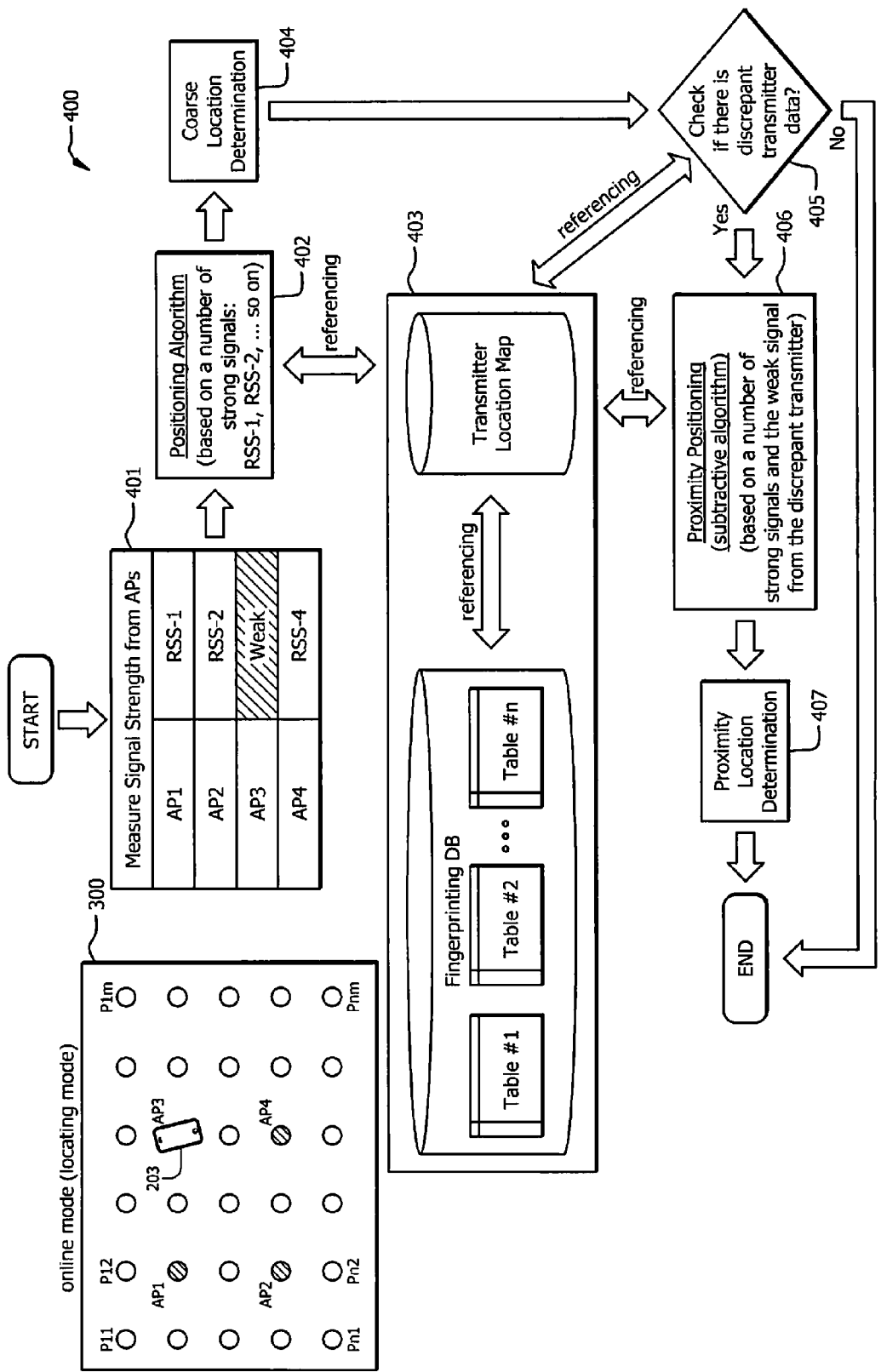
FIG. 4 illustrates a wireless device location acquisition flow in accordance with an embodiment of the present application.

FIG. 4 illustrates a wireless device location acquisition flow 400 in accordance with an embodiment of the present application. It is understood that one or more steps of flow 400 may be taken in different order, omitted, and/or combined in order to provide a location acquisition for a wireless device.

In the illustrated example, wireless device 203 is located at coordinate P24 directly aligned with the passive region of AP3 of network area 300. Flow 400 may begin by device 203 measuring received signal strength from the APs at 401. In this example, RSS measurements are acquired for AP1-4 and a weak measurement for AP3 is observed. This information is provided to a positioning algorithm at 402.

It is noted that the positioning algorithm and other location determination calculations, for this and other embodiments, may be executed using processing devices corresponding to network resources (such as in access points or a central network processor) or may be executed using processing resources associated with the wireless device. Further, in some embodiments, processing resources from both the network and wireless device may be utilized. When/how the position is determined may be based on what device requires positioning data. For example, an application executing on the wireless device may require positioning data. Alternatively, network resources may want to obtain positioning data for various monitoring tasks or for serving devices on the network.

The positioning algorithm 402 may retrieve reference data such as data from a fingerprinting database and/or transmitter location map database at 403. Such reference data may include information discussed above with respect to FIG. 3. Reference data may also be made available where appropriate to other steps of flow 400. In the illustrated example, the positioning algorithm may first base a coarse location determination on strong RSS data and provide a coarse location determination at 404.

Flow 400 may then check to see if there is discrepant transmitter data observed. If there is no discrepant data, the position location flow ends with providing the determined coarse location. A situation like this may occur when wireless device 203 is sufficiently far from an AP such that there are no effects observed corresponding to passive zones of the APs. In the illustrated case, the weak signal at AP3 would register as discrepant because wireless device 203 is located at the same coordinates as AP3, where the passive-based region is intentional designed underneath AP3. With the presence of discrepant data, a proximity positioning algorithm may be implemented at 406. This algorithm utilizes data from the observed strong RSS measurements and together with the weak measurement to provide a fine proximity location determination at 407. It is appreciated that this proximity location determination provides a higher resolution location determination than provided for in the coarse location determination.

Figure 5:
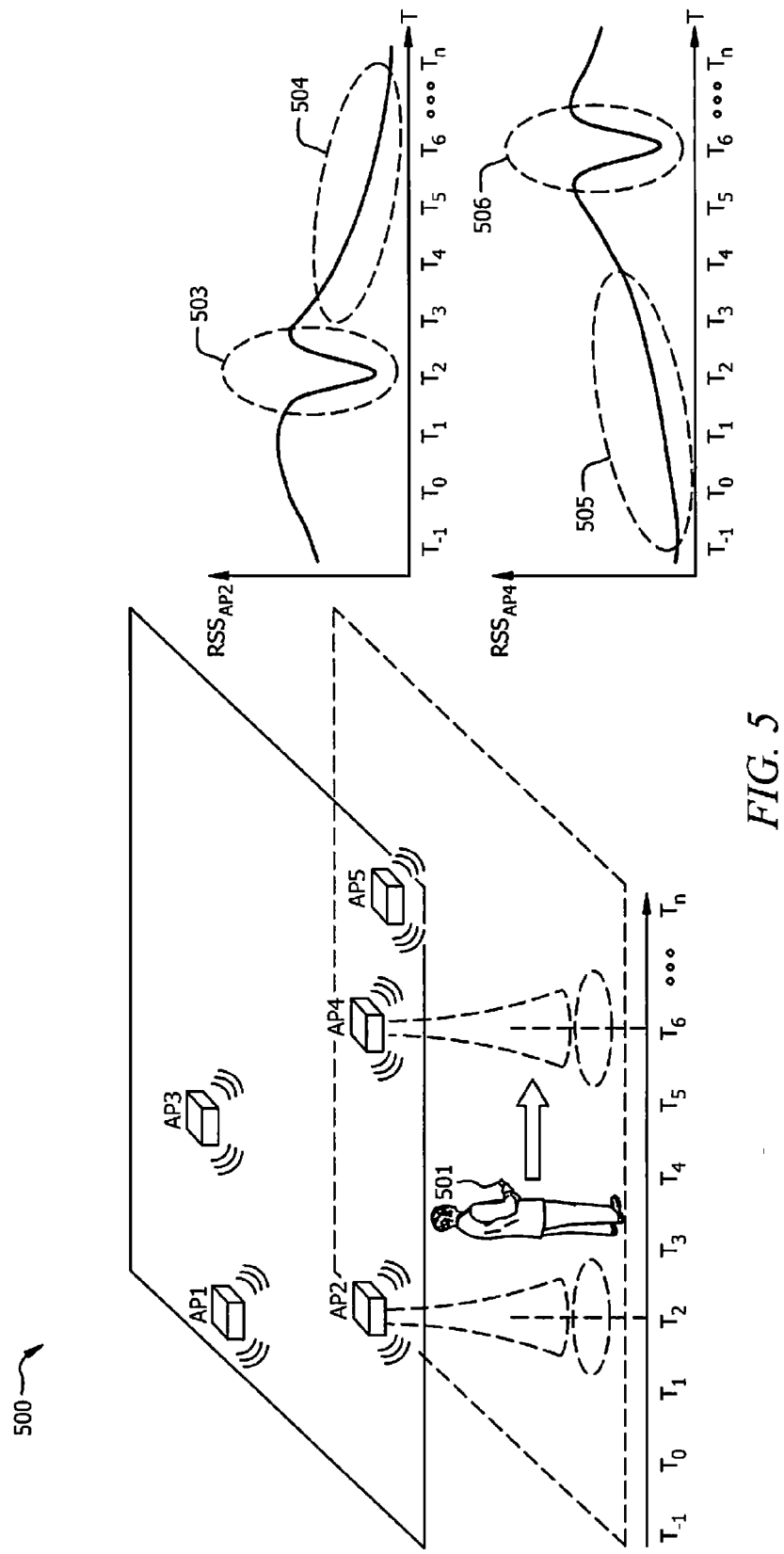
FIG. 5 illustrates a wireless network location tracking system in accordance with an embodiment of the present application.

FIG. 5 illustrates a wireless network location tracking system 500 in accordance with an embodiment of the present application. In this embodiment, a user holding wireless device 501 is moving from left to right at time increments $T_{-1}$ to $T_n$. At $T_{-1}$ wireless device 501 is situated to the left of AP2 and is in an active transmission zone of AP2. As seen in the plots of FIG. 5, when wireless device 501 moves directly under AP2 at $T_2$ into a passive zone, a rapid drop in observed RSS occurs at 503. As wireless device 502 continues to move an active zone of AP2 is reentered and a corresponding rise in RSS is observed. As wireless device continues to move away from AP2, a gradual decay in RSS 504 is observed.

From the perspective of AP4 however, at $T_{-1}$ there is a low RSS observed which gradually increases 505 as wireless device 501 moves. At $T_6$, wireless device is within the passive zone of AP4 and a corresponding sharp drop in RSS is observed at 506. Wireless device 501 then moves back into an active zone of AP4 and observes a corresponding increase in RSS.

It is appreciated by the illustration of FIG. 5 that tracking system 500 provides sufficient data to determine the position of wireless device 501 and also to track movement of device 501 through a network area. The ability to track motion (e.g. time history RSS information across locations in a network) may be utilized for the purposes of observing motion/movement and other behavior in the network. Further, tracking may be utilized in location algorithms (e.g. within embodiments illustrated in FIGS. 1-4) to distinguish whether a low RSS signal is due to a wireless device being in a passive zone or at a distance away from an AP such that the observed RSS from that AP has lowered. Such tracking information provides additional data points that may be accounted for in the fingerprinting database, as a separate reference database, and/or it may be utilized as part of an algorithm determining the location of a device.

In view of exemplary systems shown and described herein, methodologies that may be implemented in accordance with the disclosed subject matter, will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
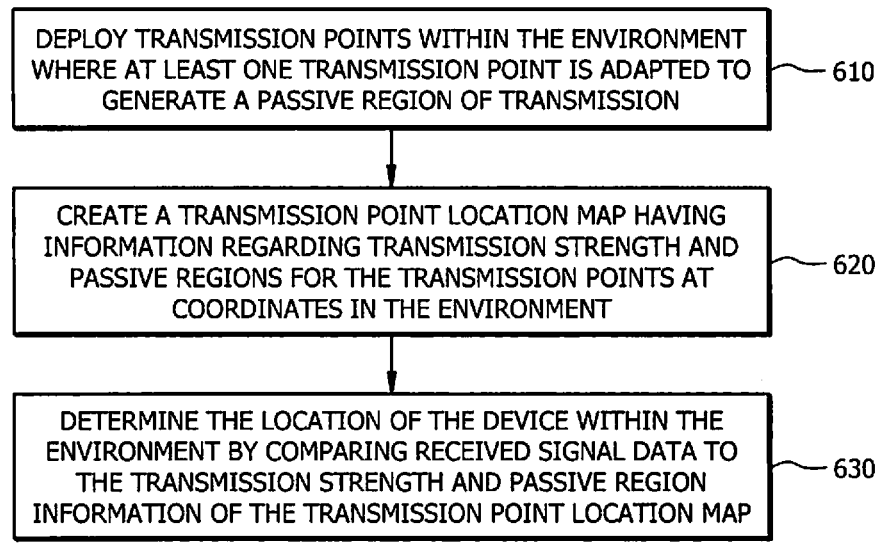
FIG. 6 illustrates a flowchart for a method in accordance with an embodiment of the present application.

In accordance with one or more aspects of the aspects described herein, with reference to FIG. 6, there is shown a methodology 600, for locating a device within an environment. It is appreciated that method 600 may be implemented in within the hardware systems and/or networks described above with respect to FIGS. 1-5. Method 600 may involve, at 610 deploying a plurality of transmission points within the environment where at least one transmission point is adapted to generate a passive region of transmission. In some embodiments, these transmission points may comprise wireless access points in a wireless network. In other embodiments, transmission points may include other radiating sources such as sources which utilize radio, electromagnetic, and/or light waves, pressure waves, sound waves, water vapor wave energy, etc.

Method 600 may involve, at 620 creating a transmission point location map having information regarding transmission strength and passive regions for the plurality of transmission points at a plurality of coordinates in the environment. Such a transmission point location map may include a fingerprinting database for scene analysis determinations which also accounts for passive-based regions.

Additionally, method 600 may involve, at 630 determining the location of the device within the environment by comparing received signal data to the transmission strength and passive region information of the transmission point location map. It is appreciated that this determination may be accomplished as discussed above. For example, the determination may be made by the device, a network device, etc. Further, it is appreciated that in some embodiments, multiple determinations may be made and movement history may be tracked for the wireless device.

Figure 7:
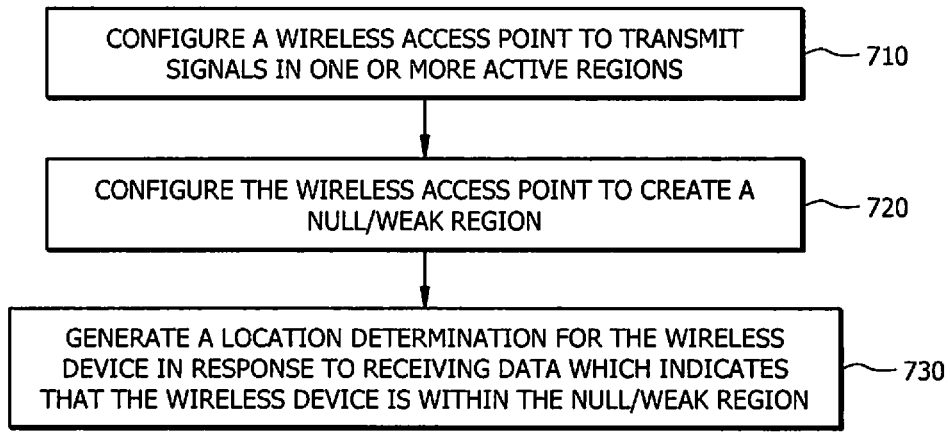
FIG. 7 illustrates a flowchart for a method in accordance with an embodiment of the present application.

In accordance with one or more aspects of the aspects described herein, with reference to FIG. 7, there is shown a methodology 700, for locating a device in a wireless network. It is appreciated that method 700 may also be implemented in within the hardware systems and/or networks described above with respect to FIGS. 1-5. Specifically, method 700 may involve, at 710 configuring a wireless access point to transmit signals in one or more active regions. Additionally, at 720, method 700 may include configuring the wireless access point to create a null/weak region. Such a null/weak region may be formed as described above, and in some aspects the method may include targeting the null/weak area at a particular point in space.

Method 700 may include, at 730, generating a location determination for the wireless device in response to receiving data which indicates that the wireless device is within the null/weak region. In accordance with more detailed aspects, method 700 may include configuring multiple wireless access points, tracking the motion of the wireless device across the multiple points, etc.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for locating a device in a wireless network, said method comprising:
configuring a wireless access point to transmit signals in one or more active regions;
configuring said wireless access point to create a null region, wherein the null region is directionally orientable toward a particular targeted area; and
upon receiving data which indicates that a wireless device is within the null region, generating a location determination for the wireless device.

2. The method of claim 1 further comprising:
configuring a second wireless access point to transmit signals in one or more active regions corresponding to the second wireless access point and to create a null region corresponding to the second wireless access point; and
upon receiving data which indicates that the wireless device has transitioned from a null region, generating motion tracking data for the wireless device.

3. The method of claim 1 wherein the wireless access point comprises a plurality of antennae.

4. The method of claim 1 wherein the null region has a weak signal strength with respect to an active region of the one or more active regions.

5. The method of claim 4 wherein the weak signal strength is sufficient to maintain a connection between the wireless device and the wireless access point.

6. A wireless network system comprising:
- at least one access point having an antenna configured to transmit signals in one or more active regions, the antenna further configured create a null region; and
- at least one processing device configured to receive data which indicates that a wireless device is within the null region of the antenna and to generate a location determination for the wireless device, and to implement a scene analysis and a passive-based proximity analysis on the received data to determine the location of the wireless device.

7. The wireless network system of claim 6 wherein the at least one processing device is configured to receive data corresponding to the wireless device transitioning between an active region and passive region and to generate tracking data for the wireless device.

8. The wireless network system of claim 6 wherein the access point comprises a plurality of antennae.

9. The wireless network system of claim 6 wherein the null region has a weak signal strength with respect to the active region of the antenna.

10. The wireless network system of claim 9 wherein the weak signal strength is sufficient to maintain a connection between the wireless device and the at least one access point.

11. The wireless network system of claim 6 further comprising a location point device having an antenna configured to transmit signals in one or more active regions, the antenna further configured create a null region.

* * * * *